United States Patent [19]

Mitchell

[11] 4,420,164

[45] Dec. 13, 1983

[54] STAND FOR DIRT BIKES

[76] Inventor: Mark T. Mitchell, 8320 E. Indianola, Scottsdale, Ariz. 85251

[21] Appl. No.: 339,729

[22] Filed: Jan. 15, 1982

[51] Int. Cl.³ .............................................. B62H 3/10
[52] U.S. Cl. .................................. 280/293; 254/131; 254/134; 248/352
[58] Field of Search ................ 280/293, 304; 254/131, 254/134; 248/352

[56] References Cited

U.S. PATENT DOCUMENTS

| 2,010,680 | 8/1935 | Van Leuven | 254/131 |
| 3,489,451 | 1/1970 | Guckenberger | 254/131 |
| 4,111,449 | 9/1978 | Hancock | 280/402 |
| 4,113,235 | 9/1978 | Hartman | 254/131 |
| 4,180,253 | 12/1979 | Ivers et al. | 254/131 |

FOREIGN PATENT DOCUMENTS 1127048  4/1962  Fed. Rep. of Germany ...... 254/131

Primary Examiner—John A. Pekar
Assistant Examiner—D. Lynn Fugate
Attorney, Agent, or Firm—Cahill, Sutton & Thomas

[57] ABSTRACT

A simple and sturdy stand for motorcycles known as dirt bikes that may be positioned between the wheels of the dirt bike and operable by the foot of the user for engaging its frame to raise and lower the front wheel of the dirt bike off of its supporting surface.

10 Claims, 5 Drawing Figures

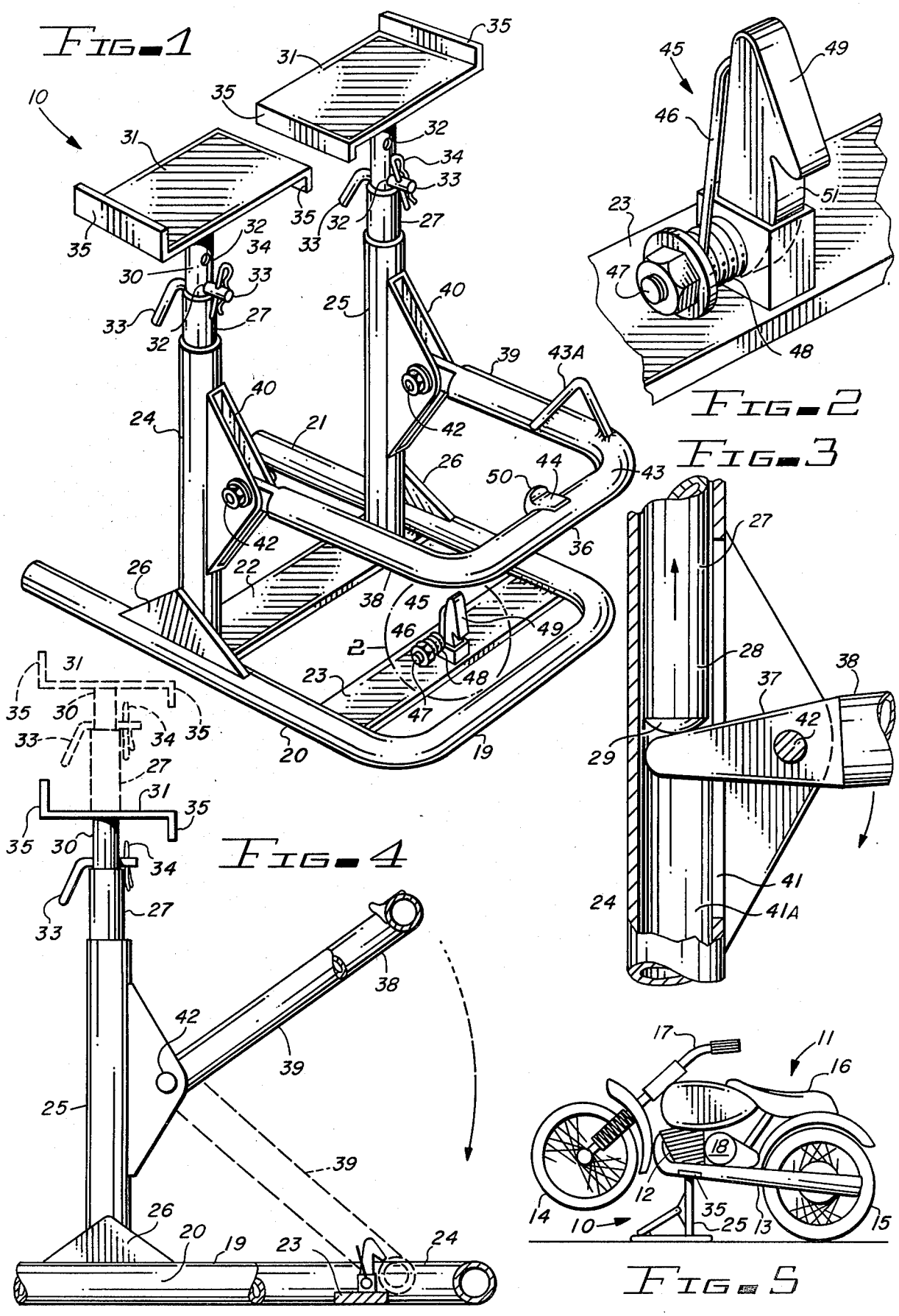

STAND FOR DIRT BIKES

BACKGROUND OF THE INVENTION

This invention relates to motorcycles and more particularly to stands for motorcycles known as "dirt bikes".

1. Field of the Invention

This invention is particularly directed to a simple, sturdy and lightweight stand for dirt bikes that may be operated by the foot of the operator in raising and lowering the front wheel of the dirt bike off of its supporting surface.

2. Description of the Prior Art

Several types of motorcyle stands or supports have been mounted on the vehicle which support the vehicle in an upright or leaning position. The lightweight motorcycles known as dirt bikes are usually provided only with a support arm which holds the bike in a leaning unstable position. No known prior art structure functions to cradle and support the frame of the dirt bike in the manner set forth and claimed herein.

In order to obviate the above disadvantages of the prior art, a new and improved stand for motorcycles of the dirt bike type is provided which is light in weight, sturdy, inexpensive to manufacture and quick and easy to operate for raising and lowering the front wheel of the motorcycle from or to the ground surface.

U.S. Pat. No. 4,111,449 is representative of bumper hitches used for raising and lowering the front wheel of a motorcycle for towing purposes.

SUMMARY OF THE INVENTION

It is, therefore, one object of this invention to provide an improved stand for motorcycles of the dirt bike type.

Another object of this invention is to provide an improved stand for lightweight motorcycles that lifts and holds one wheel of the motorcycle off of the ground in a cradle like manner.

A further object of this invention is to provide an improved stand for dirt bikes which is foot operable for raising and lowering one wheel of the bike.

A still further object of this invention is to provide a stand for motorcycles that utilizes the same manually operated means for raising and lowering the front end of a motorcycle to and from the road surface.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view showing the stand with its foot operated arm for raising and lowering the vehicle in a mid-cycle position and embodying the invention;

FIG. 2 is an enlarged perspective view of the circled portion of FIG. 1;

FIG. 3 is a partial view of one of the vertical columns of FIG. 1 broken away to show the engagement of the foot operated arm with the lifting and lowering mechanism of the stand;

FIG. 4 is a cross-sectional view of FIG. 1 showing the foot operated arm and one vertical column in various positions; and FIG. 5 is a view showing a motorcycle supported in a parked position on the stand shown in FIG. 1.

DESCRIPTION OF THE PREFERRED EMBODIMENT

Referring more particularly to the drawing by characters of reference, FIGS. 1-5 illustrate a stand 10 for supporting, raising and lowering the front end of a motorcycle 11 shown in FIG. 5.

As illustrated in FIG. 5, motorcycle 11, known by some as a dirt bike, comprises a two wheeled vehicle resembling a bicycle which is propelled by an internal combustion engine 12 slung in a frame 13 between wheels 14 and 15. The operator sits astride the frame on a saddle 16 and steers the vehicle by handlebars 17 after the manner of the bicyclist. The engine, usually of two cylinders, is air cooled. The power is conveyed to the rear wheel structure through a transmission gear box 18 by a shaft or sprocket chain (not shown).

Stand 10 comprises a base 19 formed of a tubular metallic material which is bent into a U-shaped configuration, legs 20 and 21 of which are reinforced by bridging base plates 22 and 23, as shown in FIG. 1.

A pair of hollow tubular support columns 24 and 25 are mounted to extend in substantially perpendicular arrangement with the associated legs 20 and 21, respectively. Each column is firmly secured along one end thereof to a flange 26 which in turn is firmly secured to the associated legs 20 and 21 and to the top of base plate 22 in a juxtapositioned and parallel arrangement with the other column.

The open free ends of columns 24 and 25 are each arranged to receive in a sliding and telescopic manner an elongated tubular collar 27. Collars 27, which are substantially identical and given the same reference character each have a closed end 28 positioned within its respective column which, as shown in FIG. 3, is provided with a rounded outer periphery 29.

The exposed open ends of tubular collars 27 are each arranged to receive therein in a sliding and telescopic manner a tubular support cylinder 30. Each cylinder 30 supports at its exposed end a platform 31 which is attached at approximately its center to extend laterally of the longitudinal axis of cylinder 30.

It should be noted that each support cylinder 30 is provided with a plurality of spaced holes 32 extending along its length with each hole extending through the cylinder substantially perpendicular to its longitudinal axis. In order to adjustably position support cylinders 30 and their associated platforms 31 at a given elevation, bent pins 33 are each arranged to extend through corresponding holes 32 in different support cylinders. These pins form a means for adjustably positioning platforms 31 in one of a number of elevational positions. Each pin is held in place in holes 32 by a cotter pin 34 in a well known manner. As shown, each of platforms 31 are provided with ridges or ledges 35 at each of its ends which extend laterally of its longitudinal axis, one hundred and eighty degrees out of phase with the other. Since the support cylinders are rotatably mounted in the open ends of tubular columns 24 and 25, these ledges may be positioned on the outside of frame 13 of the motorcycle, as shown in FIG. 5, or inside of the frame, if so desired.

In order to simultaneously raise the movable portions of stand 10, i.e., tubular collars 27, support cylinders 30 and platforms 31 associated with each of the support columns 24 and 25, a U-shaped lever arm 36 is pivotally mounted on these support columns at points spaced from the tapered ends 37 of each of its legs 38 and 39.

As shown in FIG. 1, each end of legs 38 and 39 of lever arm 36 extends through a clevis 40 which is fixedly attached as by welding to extend axially along the outside surface of support columns 24 and 25. Each clevis is provided with an opening 41, shown in FIG. 3, to extend longitudinally of the associated support column 24 or 25 so that the tapered free end 37 of one of legs 38 and 39 of U-shaped lever arm 36 can extend through the forked ends of clevis 40, apertures or openings 41 in the associated clevis, holes 41A in the associated support column and into the interior of the support column at a point immediately below the rounded end 28 of the associated tubular collar 27. Thus, tubular collars 27, support cylinders 30 and platforms 31 rest on and are raised or lowered depending on the pivotal position of lever arm 36. As shown, each leg of lever arm 36 is pivotally connected to a clevis 40 by pins or bolts 42 spaced at similar points from their tapered ends 37.

When lever arm 36 is actuated to raise the front end of a motorcycle to the position shown in FIG. 5, an operator places the sole of his or her shoe on a foot support 43A which is welded to leg 39 of lever arm 36. By the weight applied through the foot of the operator, lever arm 36 is pivoted downwardly to the position shown in dash lines in FIG. 4 which action causes the tips 37 of legs 38 and 39 of lever arm 36 to push upwardly tubular collars 27, support cylinders 30 and platforms 31 a predetermined distance to raise the front end of a motorcycle in the manner shown in FIG. 5.

When lever arm 36 and particularly bight 43 of its U-shaped configuration has reached the limit of its downward movement, a clip 44 mounted thereon engages with a spring biased catch 45 mounted on base plate 23. The spring biased catch 45, as shown in FIG. 2, comprises an arm 46 pivotally mounted on a bolt 47 and is spring biased in a clockwise direction by a spring 48. The peripheral surface 49 of arm 46 serves as a camming surface for the movement of the outer periphery of clip 44 thereover upon the downward movement of lever arm 36 to its lowermost position. After clip 44 has moved over the camming surface 49 of catch 45, its upper edge 50 is moved into and firmly gripped by slot 51 formed in catch 45 under the biasing action of spring 48.

To release clip 44 from slot 51 of catch 45, the operator pushes with his or her foot against the camming surface 49 of catch 45 and the biasing action of spring 48 to release edge 50 of clip 44 from the holding grip of catch 45.

The weight of the front end of the motorcycle will then cause the tubular collars to retract into support columns 24 and 25, thereby lowering the front end of the motorcycle to ground level. Since the foot of the operator used for releasing catch 45 from clip 44 rests on bight 43 of lever arm 36, pressure may be applied by the operator to the lever arm 36 to control the upward movement of the lever arm and in turn the downward movement of tubular columns 27 and the front end of the motorcycle.

Although but one embodiment of the present invention has been illustrated and described, it will be apparent to those skilled in the art that various changes and modifications may be made therein without departing from the spirit of the invention or from the scope of the appended claims.

What is claimed is:

1. A motorcycle stand comprising:
   a base,
   a pair of spaced, vertically arranged hollow columns mounted on said base,
   each of said columns having a collar mounted thereon in a telescopic arrangement for extending or reducing the combined length of each of said columns and its associated collar,
   a lever arm pivotally mounted on said columns, the movement of which in a predetermined manner simultaneously moves each of the collars relative to its associated column,
   a spring biased catch mounted on said base, and
   a clip mounted on said lever arm for engagement by said spring biased catch for holding the collars in a given position relative to said columns when said lever arm is moved a predetermined distance in a given direction, and
   a surface on said catch, said catch responsive to the contact of an operator's foot against said surface for disengaging said clip to permit a reduction of the combined length of said columns and their associated collars by the weight of the motorcycle on the stand.

2. The motorcycle stand set forth in claim 1 wherein said collars are of a hollow tubular configuration mounted one in each end of said columns for telescopic sliding movement therein.

3. The motorcycle stand set forth in claim 2 wherein said lever arm comprises a U-shaped configuration with the terminal ends of its legs extending through apertures in said columns to a point in said columns immediately adjacent the lower ends of said collars.

4. The motorcycle stand set forth in claim 3 wherein the terminal ends of said legs are tapered.

5. The motorcycle stand set forth in claim 4 wherein said lever arm is provided with a support for the foot of the operator to aid in moving the lever arm in a given direction.

6. The motorcycle stand set forth in claim 4 wherein each leg of said lever arm is pivotally mounted on a clevis fixed to a different one of said columns.

7. The motorcycle stand set forth in claim 6 wherein:
   a support cylinder is mounted in the exposed end of each collar, and
   a platform is mounted on the exposed end of each support cylinder to extend laterally thereof for engaging a part of the frame of a motorcycle.

8. The motorcycle stand set forth in claim 7 wherein:
   each of said support cylinders is provided with a plurality of holes spacedly arranged along its length in like position on each support cylinder, said holes extending laterally through said support cylinders, and
   means mounted in said holes for holding each of said support cylinders in said tubular collars in like relative positions.

9. The motorcycle stand set forth in claim 8 wherein said means comprises a cotter pin.

10. A motorcycle stand comprising:
    a base,
    at least one vertically arranged hollow column mounted on said base, said column having a collar mounted thereon in a telescopic arrangement for extending or reducing the combined length of said column and its associated collar, a lever arm pivotally mounted on said column, the movement of which in a predetermined manner simultaneously moves said collar relative to its associated column, a spring biased catch mounted on said base, a clip mounted on said lever arm for engagement by said spring biased catch for holding the collar in a given position relative to said column when said lever arm is moved a predetermined distance in a given direction, and a surface on said catch, said catch responsive to the contact of an operator's foot against said surface for disengaging said clip to permit a reduction of the combined length of said column and the associated collar by the weight of the motorcycle on the stand.

* * * * *